(12) United States Patent
Freeman et al.

(10) Patent No.: US 7,200,761 B1
(45) Date of Patent: Apr. 3, 2007

(54) METHOD TO USE SECURE PASSWORDS IN AN UNSECURE PROGRAM ENVIRONMENT

(75) Inventors: Joseph Wayne Freeman, Raleigh, NC (US); Randall Scott Springfield, Chapel Hill, NC (US); Steven Dale Goodman, Raleigh, NC (US); Isaac Karpel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 09/711,028

(22) Filed: Nov. 9, 2000

(51) Int. Cl.
*G06F 9/00* (2006.01)
*G06F 11/30* (2006.01)
*G06F 15/173* (2006.01)
*G06F 15/16* (2006.01)
*H04L 9/00* (2006.01)

(52) U.S. Cl. ............... 713/202; 713/1; 713/2; 713/100; 713/164; 713/167; 713/200; 713/201; 709/223; 709/224; 709/225; 709/226; 709/229

(58) Field of Classification Search .......... 713/1, 713/2, 100, 200–202, 164, 167; 709/223–229
See application file for complete search history.

(56) References Cited

U.S. PATENT DOCUMENTS

| | | | |
|---|---|---|---|
| 5,537,544 A * | 7/1996 | Morisawa et al. | 713/202 |
| 5,850,559 A * | 12/1998 | Angelo et al. | 713/320 |
| 5,887,131 A * | 3/1999 | Angelo | 713/202 |
| 5,944,821 A * | 8/1999 | Angelo | 713/200 |
| 5,953,422 A * | 9/1999 | Angelo et al. | 713/185 |
| 5,964,877 A | 10/1999 | Victor et al. | 713/202 |
| 5,974,500 A | 10/1999 | Maletsky et al. | 711/103 |
| 6,009,495 A | 12/1999 | DeRoo et al. | 711/103 |
| 6,128,732 A * | 10/2000 | Chaiken | 713/2 |
| 6,178,550 B1 * | 1/2001 | Pearce | 717/100 |
| 6,223,284 B1 * | 4/2001 | Novoa et al. | 713/100 |
| 6,336,185 B1 * | 1/2002 | Sargenti et al. | 713/2 |

(Continued)

OTHER PUBLICATIONS

Yokote et al., 1995, Department of Computer Science, Keio University, p. 385-398, "SCONE: Using Concurrent Objects for Low Level Operating System Programming" OOPSLA '95 Austin, TX, USA © 1995 ACM 0-89791-703-0/95/2010.*

*Primary Examiner*—Ayaz Sheikh
*Assistant Examiner*—Jenise Jackson
(74) *Attorney, Agent, or Firm*—George E. Grosser; Dillon & Yudell LLP (57) ABSTRACT

During power up initialization, security data such as passwords and other sensitive data which are stored in a lockable memory device are read and copied to protected system management interrupt (SMI) memory space, subject to verification by code running in the SMI memory space that the call to write the security data originates with a trusted entity. Once copied to SMI memory space, the security data is erased from regular system memory and the lockable storage device is hard locked (requiring a reset to unlock) against direct access prior to starting the operating system. The copy of the security data within the SMI memory space is invisible to the operating system. However, the operating system may initiate a call to code running in the SMI memory space to check a password entered by the user, with the SMI code returning a "match" or "no match" indication. The security data may thus be employed after the lockable memory device is hard locked and the operating system is started.

33 Claims, 3 Drawing Sheets

U.S. PATENT DOCUMENTS 6,343,338 B1 * 1/2002 Reneris ................. 710/200
6,446,213 B1 * 9/2002 Yamaki ................. 713/300
6,532,510 B2 * 3/2003 Klein ................... 710/260

* cited by examiner

METHOD TO USE SECURE PASSWORDS IN AN UNSECURE PROGRAM ENVIRONMENT

BACKGROUND OF THE INVENTION

1. Technical Field

The present invention generally relates to data processing system access control and in particular to password controlled access during power up initialization. Still more particularly, the present invention relates to preserving security of a password employed during power up initialization while allowing the password to be employed by the operating system.

2. Description of the Related Art

Many personal computer systems employ various password schemes to control system behavior before the operating system is started. For example, where a system is used by more than one user, the password may be employed to set "preferences," or user-specific attributes for the operating system behavior.

A potential security problem arises as a result of how the passwords are stored in the system. Particularly on low cost systems, such passwords are commonly stored in a CMOS memory and can be easily read by a program which is run after the operating system is started. Various storage techniques may be employed in storing the passwords to make them less accessible than plain ASCII text strings, such as storing strings of keyboard scan codes or storing a hash of the ASCII text string or keyboard scan code string.

The most secure technique for password storage is to keep the passwords in a nonvolatile storage device which can be locked down "hard" (i.e., requiring a reset to unlock) before the operating system is started. On some systems, several other types of information which is considered sensitive, such as the order of boot device list, is also saved in this lockable storage device.

Because this technique prevents access to the passwords after the operating system is started, use of the passwords in any other environment other than the "pre-boot" environment is precluded. In some situations, however, use of the passwords to verify the user's identity during operation after the operating system is started may be useful.

It would be desirable, therefore, to provide a mechanism for maintaining the security of "pre-boot" passwords while allowing use of such passwords after the operating system is started.

SUMMARY OF THE INVENTION

It is therefore one object of the present invention to provide improved data processing system access control.

It is another object of the present invention to provide improved password controlled access during and after power up initialization.

It is yet another object of the present invention to provide a mechanism preserving security of a password employed during power up initialization while allowing the password to be employed by the operating system.

The foregoing objects are achieved as is now described. During power up initialization, security data such as passwords and other sensitive data which are stored in a lockable memory device are read and copied to protected system management interrupt (SMI) memory space, subject to verification by code running in the SMI memory space that the call to write the security data originates with a trusted entity. Once copied to SMI memory space, the security data is erased from regular system memory and the lockable storage device is hard locked (requiring a reset to unlock) against direct access prior to starting the operating system. The copy of the security data within the SMI memory space is invisible to the operating system. However, the operating system may initiate a call to code running in the SMI memory space to check a password entered by the user, with the SMI code returning a "match" or "no match" indication. The security data may thus be employed after the lockable memory device is hard locked and the operating system is started.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
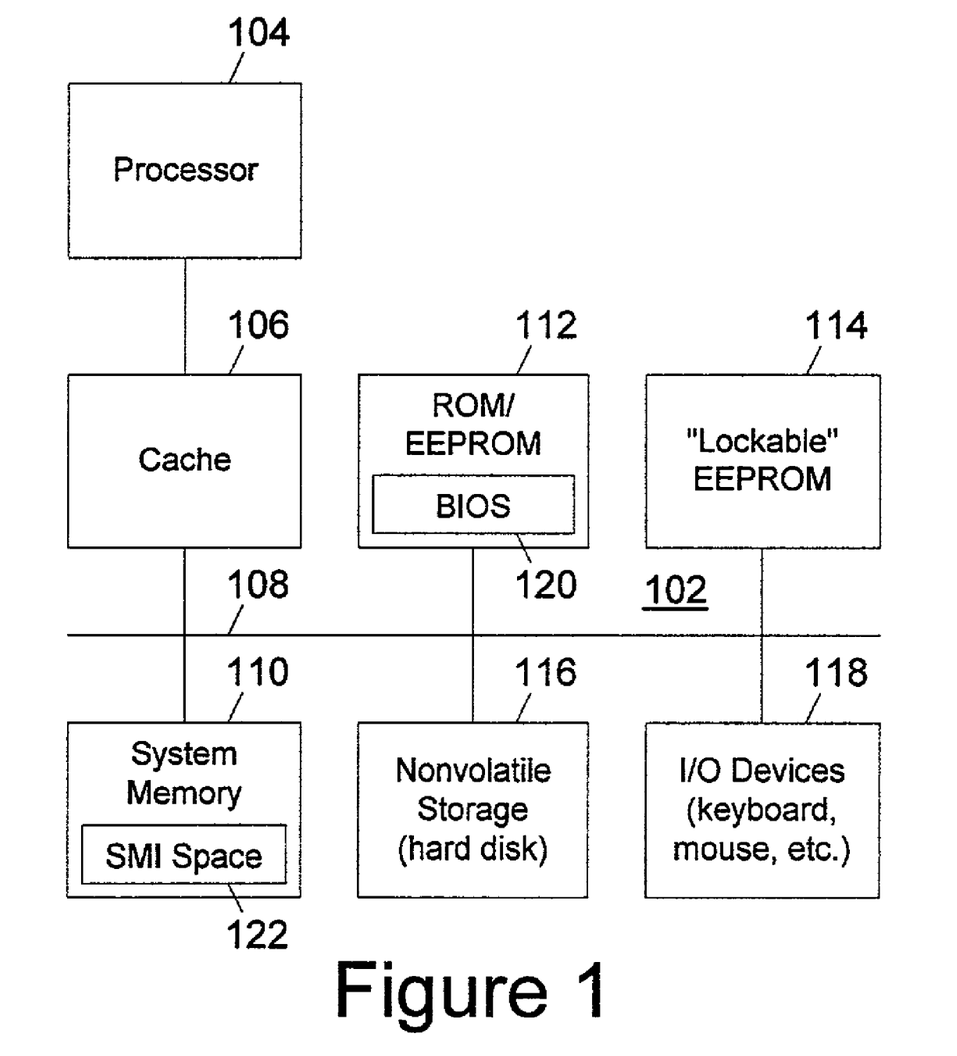
FIG. 1 depicts a high-level block diagram of a data processing system in which a preferred embodiment of the present invention is implemented.

With reference now to the figures, and in particular with reference to FIG. 1, a high-level block diagram of a data processing system in which a preferred embodiment of the present invention is implemented is depicted. Data processing system 102 includes a processor 104 coupled via a cache 106 to a system bus 108. Connected to the system bus 108 are various conventional memory devices including a system memory 110, typically a random access memory, and a set of nonvolatile read-only memory (ROM) and/or erasable, electrically programmable read only memory (EEPROM) devices 112. In the present invention, data processing system 102 also includes a "lockable" EEPROM device 114 which may be locked down hard, requiring a reset to unlock, before the operating system is started.

Also attached to system bus 108 are nonvolatile storage 116 such as a hard disk drive and a set of user input/output (I/O) devices 118, which would typically include a keyboard and a mouse or other cursor-control ("pointing") device. Other storage media, such as a CR-ROM or DVD drive, floppy disk drive, and the like may also be employed within data processing system 102, together with other user I/O devices such as a microphone, speakers/headphones, and the like.

The operation of data processing system 102 is well known in the relevant art, and only so much of the operation as is required for an understanding of the present invention will be described herein. During initial power-on (commonly referred to a "power-on, self-test" or "POST") of data processing system 102, a startup routine including a basic input/output system (BIOS) 120 is loaded from nonvolatile memory devices 112 into system memory 110 and executed to configure the various hardware devices within data processing system 102 for operation by loading device drivers and/or setting system parameters, for instance. An operating system is then loaded from nonvolatile storage 116 and started.

Before the operating system is started, however, the startup routine prompts the user for a password. Once the user enters a password, the startup routine compares the entered password to a password stored within lockable memory device 114. If a match is identified, the operating system is started; if not, either the operating system is not started or the operating system is started without some features enabled. Prior to starting the operating system, however, the lockable memory device 114 is locked down hard to prevent any direct access of the contents by a programming running on the operating system.

In order to allow the password to also be utilized outside the "pre-boot" environment of the startup routine, during the system startup process while the BIOS is still in complete control over data processing system 102, the lockable memory device 114 containing the password(s) and other sensitive data is read out and the content copied to a restricted portion 122 of the system memory 110. This restricted section 122 of the system memory 110 is invisible to the operating system and has associated very tightly defined methods for accessing the contents of restricted memory 122.

For Intel-compatible processors, the restricted memory region 122 in the exemplary embodiment 102 is the system management interrupt (SMI) memory space. The SMI memory space contains code and data needed for low level, operating system independent system control functions, and uses a method to authenticate that the calling program which is requesting permission to place data in SMI memory space is a trusted entity (the BIOS startup routine qualifies as such a trusted entity). For other types of processors, a similar restricted memory space which is (1) invisible to the operating system and programs running under the operating system and (2) has access restricted to trusted entities may be employed.

After the password(s) and other sensitive data are copied into SMI memory space, the lockable memory device 114 is locked down hard to render the content secure from direct access by programs running under the operating system. Since the password and other sensitive data is still available within the SMI memory space, that information may still be utilized after the operating system boots.

Figure 2:
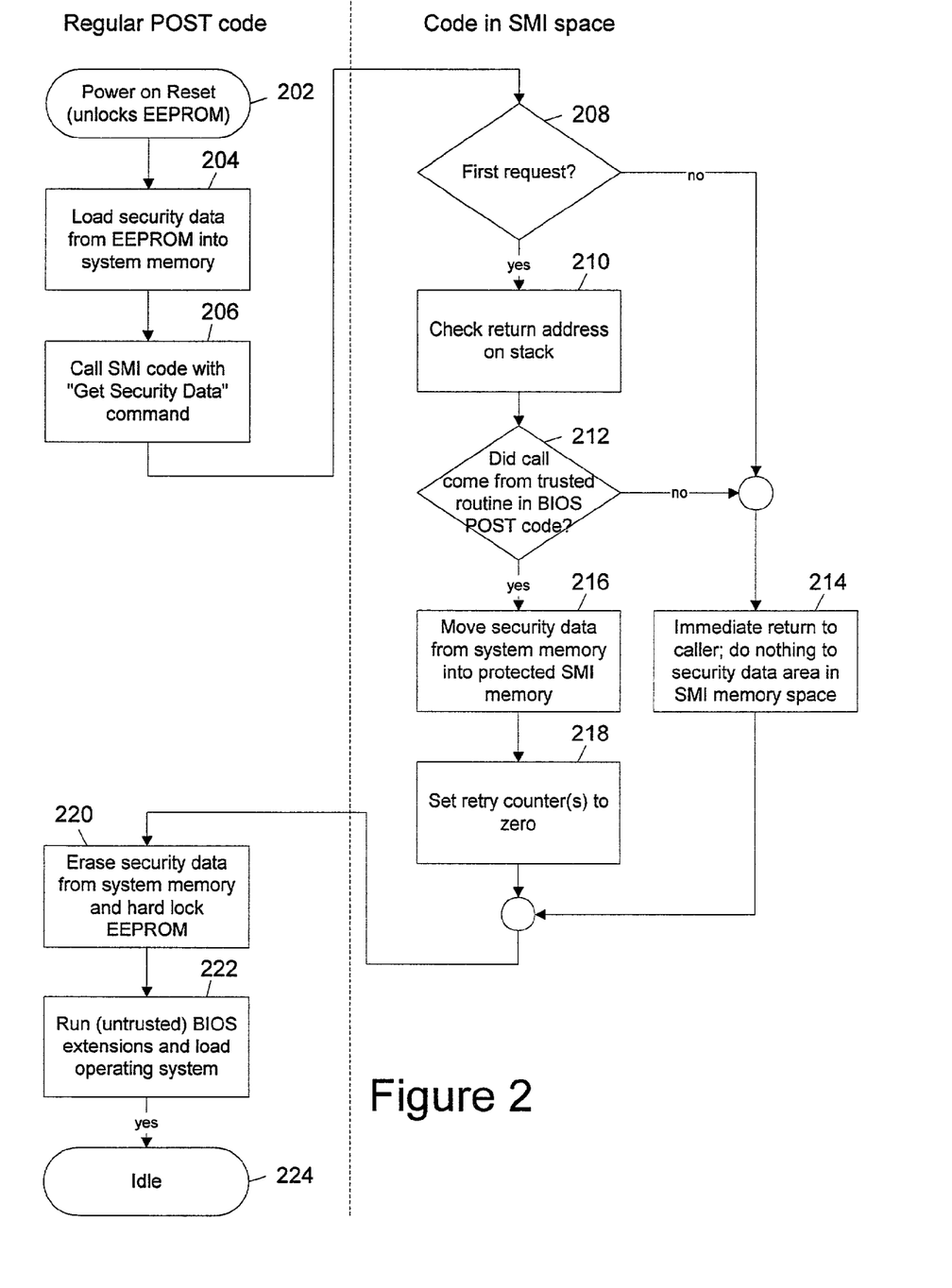
FIG. 2 is a high level flow chart for a process, during power-up initialization, of gathering security data from a nonvolatile storage device and securing that data within the SMI memory space for later use in the operating system environment in accordance with a preferred embodiment of the present invention.

Referring to FIG. 2, a high level flow chart for a process, during power-up initialization, of gathering security data from a nonvolatile storage device and securing that data within the SMI memory space for later use in the operating system environment in accordance with a preferred embodiment of the present invention is illustrated. The flow chart is drawn to illustrate which steps are performed by the regular POST code and which are performed by code running in the SMI memory space.

The process begins as step 202, which depicts the power on reset signal being asserted during power up initialization (POST) as a result of either the application of power to the system (previously powered off) or from a write to a specific input/output device within the system. The power on reset signal resets the hard lock state of the nonvolatile memory device (EEPROM in the exemplary embodiment) containing the passwords and other sensitive data and allows the contents of the EEPROM to be read by the POST BIOS code.

The process first passes to step 204, which illustrates loading the security data (passwords and other sensitive data) from the EEPROM into regular system memory, and then to step 206, which depicts invoking code present in the SMI memory space with a command which means "Get the security data from regular memory and move that data into SMI memory." The methods of initializing code that runs in SMI space, command calling conventions, and the passing of data pointers are all well known in the art and will not be repeated herein.

Of importance to the next step, when the POST code invokes the code running in SMI space, a label is placed in the source code immediately following the call to invoke the SMI code. When the BIOS is assembled, the address of this label is placed within the SMI code to facilitate the next step. Only one place within the BIOS code will make this call to the SMI code, enabling the SMI code to ascertain if the call came from the "trusted" caller.

The process next passes to step 208, which illustrates determining whether the request is a first request. Only one request to copy data into SMI memory space is allowed for each power-up cycle by limiting the ability to copy data to the SMI memory space to a single request in the exemplary embodiment. Other, similar secure methods may alternatively be employed to restrict copying of data to the SMI memory space. If the request at step 208 is determined not to be a first request, the process proceeds to step 214; if the request is a first request, however, the process passes instead to step 210, which illustrates checking the return address on the stack to determine if the call came from the single trusted routine in the BIOS POST code, and then passes to step 212, which depicts a determination of whether the call came from the trusted routine within the BIOS POST code. If not, the process proceeds to step 214, which illustrates an immediate return to the caller, and doing nothing to the security data area within the SMI memory space. If the call did not come from the trusted BIOS POST routine, the call is essentially ignored, blocking an attack by a program trying to load bogus security data into the SMI memory space.

If the call came from the trusted caller within the BIOS POST code, however, the process proceeds instead to step 216, which depicts the code running within the SMI memory space moving the security data from the regular system memory into the SMI memory space. SMI memory space is invisible to code running from regular system memory, which is the case for any application executing when the operating system is running. The process then passes to step 218, which illustrates the retry counter for attempts to access the security data within SMI memory space being reset.

From either of steps 214 or 218, the process next passes to step 220, which depicts erasing the security data from the regular system memory and sending commands to the EEPROM to "hard lock" the EEPROM against any attempts to read or write the EEPROM (i.e., attempts to read the data in the EEPROM return nothing while attempts to write data to the EEPROM have no effect). This "hard lock" state can only be cleared by the power on reset signal described above in connection with step 202.

The process passes next to step 222, which illustrates running any "untrusted" BIOS extensions and loading the operating system, and then to step 224, which depicts the process becoming idle until the power on reset signal is again asserted.

Figure 3:
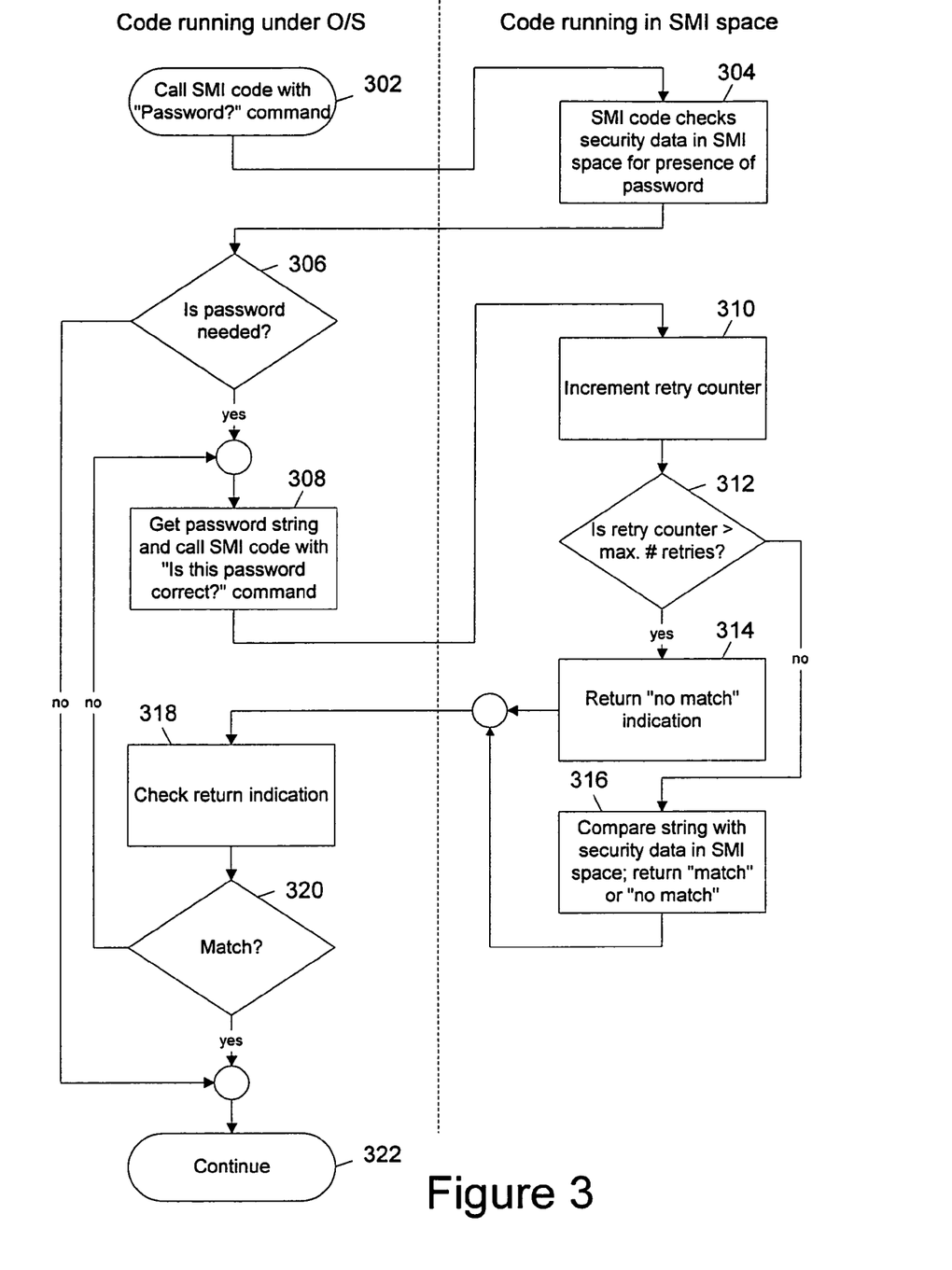
FIG. 3 depicts a high level flow chart for a process of checking the validity of a password required for specific operations to be performed in accordance with a preferred embodiment of the present invention.

With reference now to FIG. 3, a high level flow chart for a process of checking the validity of a password required for specific operations to be performed in accordance with a preferred embodiment of the present invention is depicted. Although this example relates specifically to the password, extension of the example shown to other types of security data will be apparent to those skilled in the art. The process begins at step 302, which depicts an application running under the operating system calling code within the SMI memory space to determine is a password has been set on the system.

The process proceeds to step 304, which illustrates the SMI code checking security data within the SMI memory space for the presence of a password and returning a "yes" or "no" response to the calling program indicating whether a password has been set. The process then passes to step 306, which depicts the application running under the operating system determining from the response whether a password is required. If a password has been set, the process proceeds to step 308, which illustrates the application running under the operating system prompting the user for entry of a password string, then calling the SMI code to determine whether the input password string matches the password string stored in the SMI memory space.

The process then passes to step 310, which depicts incrementing the retry counter (reset in step 216 of FIG. 2), and next to step 312, which illustrates a determination of whether the retry counter value exceeds a predetermined maximum number of allowed retries. This step allows only a certain number of retries if the password(s) input by the user do not match the password stored within the SMI memory space, blocking an attack from some code which seeks to discover the password by repeatedly submitting different passwords (e.g., feeding the application executing under the operating system a dictionary) until a match is found.

If the retry counter value exceeds the maximum number of allowed retries, the process proceeds to step 314, which depicts returning a "no match" indication to the application running under the operating system. If the retry counter value does not exceeds the maximum number of allowed retries however, the process proceeds instead to step 316, which illustrates the SMI code checking the password input by the user against the password stored in the SMI memory space and returning a "match" or "no match" indicator, as appropriate, to the application executing under the operating system.

From either of steps 314 or 316, the process passes next to step 318, which illustrates checking the return indication, and then to step 320, which depicts determining whether a "match" indication was returned. If not, the process returns to step 308 to prompt the user to reenter the password. If so, however, the process proceeds instead to step 322, which illustrates the application continuing the task requiring a password until another password is required.

One example of how the present invention might be employed is to require password approval for flash memory update operation. In the past, requiring password approval for flash memory updates using the password stored within lockable nonvolatile memory have been impractical under any operating system other than a very basic DOS environment. With the present invention, however, a flash memory update program would call the code within the SMI memory space and ask if a password is required prior to performing a flash memory update operation. If the reply is "yes," the flash memory update program prompts the user to enter the password. After the password is entered, another call is made to the SMI code to check the validity of the password entered. The SMI code compares the password entered to the data securely stored within the SMI memory space and returns a good/bad indication to the flash memory update program.

The present invention allows the security of passwords stored in the memory devices locked prior to starting the operating system to be preserved, while permitting use of the password in a secure manner for applications running under the operating system. Code running within the SMI memory space is employed to verify a password entered, preserving the password security since the password cannot be seen by the operating system.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of enabling use of a secure password, comprising:
during power up initialization before an operating system is started, copying security data from an unsecure memory device in a computer to a restricted portion of the computer's system memory which is invisible to the operating system, wherein the restricted portion of the computer's system memory contains code and data needed for low level system control functions that are independent of the operating system, and wherein a writing a data into the restricted portion of the computer's system memory is authorized only for a trusted software entity that has been authenticated as having permission to access the restricted portion of the computer's system memory, wherein the trusted software entity is a trusted routine that is part of a Basic Input/Output System (BIOS) Power-On Self Test (POST) program that is stored in the computer; and
before starting the operating system, hard locking the memory device against direct access so that a reset signal is required to unlock the memory device.

2. The method of claim 1, further comprising:
responsive to receiving an entered password under the operating system, calling a routine executing within the restricted portion of system memory to verify the password; and
receiving an indication from the routine regarding whether the entered password matched a password within the security data copied to the restricted portion of system memory from the memory device.

3. The method of claim 1, wherein the step of copying security data from a memory device to a restricted portion of system memory which is invisible to the operating system further comprises:
checking a return address for a call requesting that the security data be copied to verify that the call originated with the trusted routine.

4. The method of claim 3, wherein the step of checking a return address for a call requesting that the security data be copied to verify that the call originated with the trusted routine further comprises:
placing a label within a basic input/output services routine implementing a process for copying the security data immediately after instructions for the call requesting that the security data be copied;
placing an address for the label within code executing within the restricted portion of system memory and checking the return address for the call requesting that the security data be copied;
comparing the return address and the address for the label;
responsive to determining that the return address does not match the address for the label, returning a null response to the call requesting that the security data be copied; and
responsive to determining that the return address matches the address for the label, copying the security data to the restricted portion of system memory and resetting a retry counter.

5. The method of claim 1, wherein the step of copying security data from a memory device to a restricted portion of system memory which is invisible to the operating system further comprises:
copying the password and other sensitive data which requires protection from access under the operating system.

6. The method of claim 1, wherein the step of copying security data from a memory device to a restricted portion of system memory which is invisible to the operating system further comprises:
loading the security data to regular system memory prior to initiating the call requesting that the security data be copied; and
upon receiving any response to the call requesting that the security data be copied, erasing the security data from regular system memory before starting the operating system.

7. A method of enabling use of a secure password, comprising:
responsive to receiving an entered password under an operating system, calling a routine executing within a restricted portion of system memory to verify the password, wherein the restricted portion of system memory is invisible to the operating system and wherein the operating system and routine executing within the restricted portion of system memory communication through a calling convention, and wherein the restricted portion of the system memory contains code and data needed for low level system control functions that are independent of the operating system, and wherein a writing of data into the restricted portion of the system memory is authorized only for a trusted software entity that has been authenticated as having permission to access the restricted portion of the system memory, wherein the trusted software entity is a trusted routine in a Basic Input/Output System (BIOS) Power-On Self Test (POST) program that is stored in the computer; and
receiving only an indication from the routine executing within the restricted portion of memory regarding whether the entered password matched a password stored within the restricted portion of system memory.

8. The method of claim 7, further comprising:
during power up initialization before the operating system is started, copying a password from a memory device to the restricted portion of system memory; and
before starting the operating system, hard locking the memory device against direct access so that a reset signal is required to unlock the memory device.

9. The method of claim 7, further comprising:
determining whether a password is required for an operation by checking with the routine executing within a restricted portion of system memory to verify existence of a password.

10. The method of claim 7, further comprising:
limiting a number of retries for a user to reenter a password.

11. The method of claim 7, further comprising:
transmitting the entered password entered by a user to the routine executing within a restricted portion of system memory using the calling convention; and
responsive to receiving an indication from the routine executing within the restricted portion of memory that the entered password matched the password stored within the restricted portion of system memory, continuing an operation requiring the entered password for execution.

12. A data processing system, comprising:
a memory device which may be hard locked against direct access so that a reset signal is required to unlock the memory device; and
a power up initialization routine executing within the data processing system, wherein the power up initialization routine, before starting an operating system, copies security data from the memory device in a computer to a restricted portion of the computer's system memory which is invisible to the operating system and hard locks the computer's memory device, wherein the restricted portion of the computer's system memory contains code and data needed for low level system control functions that are independent of the operating system, and wherein a writing of data into the restricted portion of the computer's system memory is authorized only for a trusted software entity that has been authenticated as having permission to access the restricted portion of the computer's system memory.

13. The data processing system of claim 12, wherein the power up initialization routine, responsive to receiving an entered password under the operating system, calls a routine executing within the restricted portion of system memory to verify the password and receives an indication from the routine regarding whether the entered password matched a password within the security data copied to the restricted portion of system memory from the memory device.

14. The data processing system of claim 13, wherein the routine executing within the restricted portion of system memory checks a return address for a call requesting that the security data be copied to verify that the call originated with a trusted routine.

15. The data processing system of claim 13, wherein the power up initialization routine, to facilitate checking a return address for a call requesting that the security data be copied to verify that the call originated with a trusted routine, places a label within a basic input/output services routine implementing a process for copying the security data immediately after instructions for the call requesting that the security data be copied, wherein the routine executing within the restricted portion of system memory contains an address for the label, checks the return address for the call requesting that the security data be copied, and compares the return address and the address for the label and, responsive to determining that the return address does not match the address for the label, returning a null response to the call requesting that the security data be copied, and responsive to determining that the return address matches the address for the label, copying the security data to the restricted portion of system memory and resetting a retry counter.

16. The data processing system of claim 12, wherein the power up initialization routine copies the password and other sensitive data which requires protection from access under the operating system.

17. The data processing system of claim 12, wherein the power up initialization routine loads the security data to regular system memory prior to initiating the call requesting that the security data be copied and, upon receiving any response to the call requesting that the security data be copied, erases the security data from regular system memory before starting the operating system.

18. A data processing system, comprising:
 an operating system;
 a memory device which may be hard locked against direct access so that a reset signal is required to unlock the memory device;
 a system memory including a restricted portion invisible to the operating system, wherein the operating system and routines executing within the restricted portion of system memory communicate through a calling convention; and
 a power up initialization routine executing within the data processing system, wherein the power up initialization routine, responsive to receiving an entered password under an operating system, calls a routine executing within a restricted portion of system memory to verify the password, and receives an indication from the routine executing within the restricted portion of memory regarding whether the entered password matched a password stored within the restricted portion of system memory, wherein the restricted portion of the system memory contains code and data needed for low level system control functions that are independent of the operating system, and wherein a writing of data into the restricted portion of the system memory is authorized only for a trusted software entity that has been authenticated as having permission to access the restricted portion of the system memory.

19. The data processing system of claim 18, wherein the power up initialization routine, during power up initialization before the operating system is started, copies a password from the memory device to the restricted portion of system memory and, before starting the operating system, hard locks the memory device against direct access so that a reset signal is required to unlock the memory device.

20. The data processing system of claim 18, wherein the power up initialization routine determines whether a password is required for an operation by checking with the routine executing within a restricted portion of system memory to verify existence of a password.

21. The data processing system of claim 18, wherein the routine executing within a restricted portion of system memory to verify the password limits a number of retries for a user to reenter a password.

22. The data processing system of claim 18, wherein the power up initialization routine transmits the entered password entered by a user to the routine executing within a restricted portion of system memory using the calling convention and, responsive to receiving an indication from the routine executing within the restricted portion of memory that the entered password matched the password stored within the restricted portion of system memory, continues an operation requiring the entered password for execution.

23. A computer program product within a computer usable medium for enabling use of a secure password, comprising:
 instructions for copying security data from a memory device in a computer to a restricted portion of the computer's system memory which is invisible to the operating system during power up initialization before an operating system is started, wherein the restricted portion of the computer's system memory contains code and data needed for low level system control functions that are independent of the operating system, and wherein a writing of data into the restricted portion of the computer's system memory is authorized only for a trusted software entity that has been authenticated as having permission to access the restricted portion of the computer's system memory; and
 instructions for hard locking the memory device against direct access so that a reset signal is required to unlock the memory device before starting the operating system.

24. The computer program product of claim 23, further comprising:
 instructions, responsive to receiving an entered password under the operating system, for calling a routine executing within the restricted portion of system memory to verify the password; and
 instructions for receiving an indication from the routine regarding whether the entered password matches a password within the security data copied to the restricted portion of system memory from the memory device.

25. The computer program product of claim 23, wherein the instructions for copying security data from a memory device to a restricted portion of system memory which is invisible to the operating system further comprise:
 instructions for checking a return address for a call requesting that the security data be copied to verify that the call originated with a trusted routine.

26. The computer program product of claim 25, wherein the instructions for checking a return address for a call requesting that the security data be copied to verify that the call originated with a trusted routine further comprise:
 instructions for placing a label within a basic input/output services routine implementing a process for copying the security data immediately after instructions for the call requesting that the security data be copied;
 an address for the label within code executing within the restricted portion of system memory and checking the return address for the call requesting that the security data be copied;
 instructions for comparing the return address and the address for the label;
 instructions, responsive to determining that the return address does not match the address for the label, for returning a null response to the call requesting that the security data be copied; and
 instructions, responsive to determining that the return address matches the address for the label, for copying the security data to the restricted portion of system memory and resetting a retry counter.

27. The computer program product of claim 23, wherein the restricted portion of the system memory is a System Management Interrupt (SMI) memory space.

28. The method of claim 1, wherein the restricted portion of the system memory is a System Management Interrupt (SMI) memory space.

29. The method of claim 7, wherein the restricted portion of the system memory is a System Management Interrupt (SMI) memory space.

30. The data processing system of claim 12, wherein the restricted portion of the system memory is a System Management Interrupt (SMI) memory space.

31. A method comprising:
   asserting a Power-On Self Test (POST) Basic Input/Output System (BIOS) program in a computer;
   in response to the POST BIOS program being asserted, setting a hard lock state on a non-volatile memory that contains sensitive data;
   in response to the POST BIOS program being asserted, permitting an execution of a reading of the sensitive data in the non-volatile memory;
   loading the sensitive data from the non-volatile memory into a non-protected system memory in the computer; and
   in response to a call to code in a System Memory Interrupt (SMI) memory space, using the code in the SMI memory space to move the sensitive data from the non-protected system memory to the SMI memory space.

32. The method of claim 31, wherein the move of sensitive data from the non-protected system to the SMI memory space is permitted only if the call is a first request to copy the sensitive data from the non-protected system memory to the SMI memory space.

33. The method of claim 31, further comprising:
   appending a label to a source code in the BIOS POST program, wherein the source code calls the code in the SMI memory space, and wherein the label contains an address of the source code;
   checking on a stack a return address for the source code when the source code calls the code in the SMI memory space;
   comparing the return address on the stack with the address in the label for the source code; and
   storing the sensitive data from the non-protected system memory to the SMI memory space only in response to determining that the address on the stack is the same as the address in the label for the source code.

* * * * *